Sept. 23, 1941.  E. M. SPLAINE  2,256,501
OPHTHALMIC MOUNTING
Filed Dec. 30, 1937
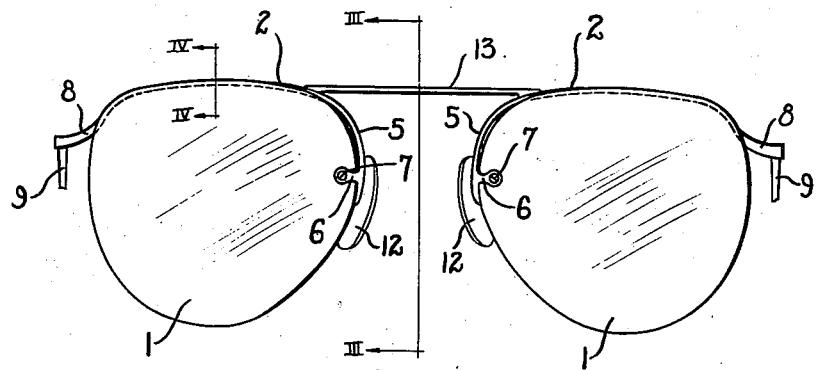
Fig. I
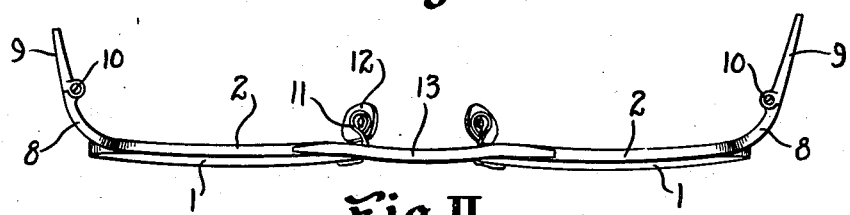
Fig. II
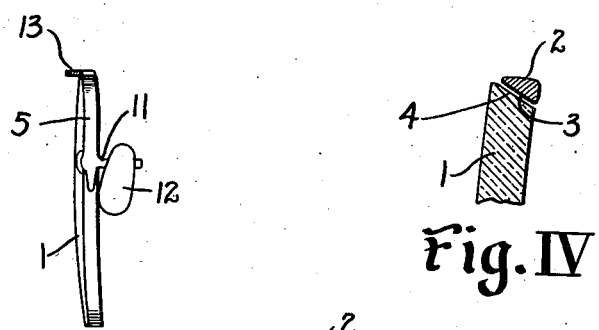
Fig. III  Fig. IV
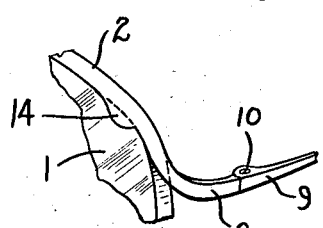
Fig. V
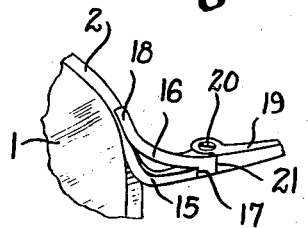
Fig. VI
INVENTOR
EDWARD M. SPLAINE
BY
Harry H. Styll
ATTORNEY Patented Sept. 23, 1941

2,256,501

UNITED STATES PATENT OFFICE 2,256,501

OPHTHALMIC MOUNTING

Edward M. Splaine, Southbridge, Mass., assignor to American Optical Company, Southbridge, Mass., a voluntary association of Massachusetts Application December 30, 1937, Serial No. 182,500

7 Claims. (Cl. 88—47)

This invention relates to improvements in ophthalmic mountings and has particular reference to improved means.

One of the principal objects of the invention is to provide a novel construction of an ophthalmic mounting wherein the strain created by displacing the temples relative to each other, in the act of placing the mounting on or removing it from the face, is removed from the lenses.

Another object of the invention is to provide a semi-rimless type of ophthalmic mounting wherein the temples are joined by supporting means extending substantially throughout the width of the lenses above the useful field of vision and which are connected by a bridge member with the major portion of said supporting means being substantially invisible and inconspicuous when the mounting is viewed from the front.

Another object is to provide temple supporting means for use in combination with lenses of rimless type wherein the said supporting means is shaped to the upper peripheral contour edge of the lenses with the said supports and upper edges being bevelled so that the said supports, when the mounting is viewed from the front, will lie behind the bevelled edges of the lenses.

Another object is to provide a reinforced temple support.

Another object is to provide means for use in combination with the supports which are shaped to follow the upper peripheral edges of the lenses for aiding and maintaining said supports in alignment with said peripheral edges.

Another object is to provide a novel construction of ophthalmic mounting wherein substantially all of the main supporting portions of said mounting are positioned above the useful field of side vision and are so constructed as to provide a wide range of adjustment wherein the parts of such mountings may be adjusted to desired fitted relation with lenses of different sizes and contour shapes and to meet the facial requirements of different individuals.

Other objects and advantages of the invention should become apparent from the following description taken in connection with the accompanying drawing and it will be apparent that many changes may be made in the details of construction and arrangement of parts shown and described without departing from the spirit of the invention as expressed in the accompanying claims. I, therefore, do not wish to be limited to the exact details shown and described as the preferred forms only have been given by way of illustration.

Referring to the drawing:

Fig. I is a front elevation of an ophthalmic mounting embodying the invention;

Fig. II is a plan view of the mounting shown in Fig. I;

Fig. III is a sectional view taken as on line III—III of Fig. I;

Fig. IV is an enlarged fragmentary sectional view taken as on line IV—IV of Fig. I;

Fig. V is a fragmentary perspective view of a modified form of construction;

Fig. VI is a view similar to Fig. V illustrating a further modification.

Up to the present time the style trend in the ophthalmic art has followed two distinct designs; namely, rimless and frame-type mountings.

Rimless type mountings although exceptionally desirable from the aesthetical view point have, in the past, been readily susceptible to breaking under the slightest shock or strain. Such mountings were also very desirable because of unobstructed vision at the peripheral edges of the lenses. The above mentioned breakage of lenses due to shock or strain, in many instances, mainly resulted from direct connections between the temple supports and lenses at the outer temporal edges of said lenses and was introduced primarily during the outward bowing of the temples when placing the mounting on or removing it from the face. Frame-type mountings eliminate substantially all of such strain but such mountings have frame portions lying within the direct field of vision and were not as desirable as rimless type mountings.

Some attempts have been made to overcome the above difficulties by providing semi-rimless constructions having temple supporting portions shaped to follow the upper peripheral edges of the lenses but these mountings, in the past, were of such construction that the supporting portions were exceptionally conspicuous either when the mounting was viewed from the front or the side and were not very desirable from the aesthetical view point.

Therefore, it is one of the primary objects of the invention to overcome the above difficulty by providing a semi-rimless type of ophthalmic mounting which will have all of the desirable features of the prior art rimless and frame-type mountings and yet be durable and desirable from the aesthetical view point.

Referring more particularly to the drawing wherein like characters of reference designate like parts throughout the several views, the mounting embodying the invention, as illustrated in Figs. I to IV inclusive, comprises a pair of lenses 1 each provided with bar-like supports 2 which are shaped substantially to the upper contour shape of the lenses and which are provided with angled under surfaces 3 shaped to fit similarly angled upper peripheral edges 4 of the lenses.

The supports 2 are provided with depending portions 5 adjacent the nasal sides of the lenses. The said portions 5 are connected with suitable lens straps or lens holding means 6 which are secured to the lenses by attaching means 7 such as screws, solder connections or other means known in the art. The depending portions 5 function as tie means between the main upper supporting portions 2 and the lens holding means and also provide means cooperating with said lens holding means for supporting the lenses in proper position before the eyes of the wearer. The bar-like supports 2 follow the bevelled edges 4 of the lenses 1 to a point adjacent the temporal edges of said lenses and terminate in outwardly and rearwardly relatively long temple supports 8 to which suitable temples 9 are pivotally attached as illustrated at 10.

The depending portions 5 also provide means to which the supporting arms 11 of the nose pads 12 may be attached.

The portions 2 may be formed of relatively rigid, pliable or resilient material as desired or the portions 5 may be formed of relatively rigid yet adjustable material with the portions 2 and 8 formed resilient or both of said portions 2 and 5 may be formed of relatively rigid material with the said portion 8 resilient. In each instance, the materials of the various portions are such that they may be adjusted and will either retain the adjusted shape or, if resilient, return to said shape when flexed and released.

The surfaces 3 and 4 are so bevelled and related with each other that the front edges of the portions 2 will be relatively narrow and the major portion of said portions 2 will be concealed behind the bevelled edges 4 of the lenses when the mounting is viewed from the front. With this construction the bar-like supports 2 will be relatively inconspicuous and substantially invisible when the mounting is viewed from the front and will yet have sufficient body to be relatively strong, durable and positive in their function.

The bar-like supports 2 are connected adjacent the nasal sides thereof by means of a bar bridge 13 secured adjacent its opposite ends to said portions 2 by welding, soldering or other desirable means. The bridge 13 may be formed of rigid, pliable or resilient material as desired or may have different portions thereof provided with one or more of the above characteristics.

If desired, as illustrated in Fig. V, the bar-like portions 2 may be provided adjacent the temporal edges thereof with one or more lip portions 14. The said lip portions being adapted to overlie either the front or rear surface of the lenses or both, depending upon whether or not one or more of said lip portions are provided on said supports. The lip or lips 14 are adapted to engage with the lenses and aid in retaining the bar-like portions 2 in alignment with the bevelled edges 4 of said lenses.

In Fig. VI the bar-like supports 2 are provided with an outwardly and rearwardly extending portion 15 similar to the portion 8, only in this instance a separate brace portion 16 having a shouldered edge 17 is provided, with which the rearward end of the support 15 is adapted to engage and is held in secured relation therewith by soldering or other suitable means. The support 16 has an end portion 18 which is shaped to blend into the main bar-like portion 2 and is secured to said portion 2 by soldering, welding or other suitable means. The shouldered end 17 has a hinge connection to which the end of the temple 19 is pivotally attached at 20 and is provided with an abutment with which a similar abutment 21 on the temple engages to limit the outward pivotal movement of the temple. This provides a rigidly constructed temple support. The portions 15 and 16 may be formed of rigid, pliable or resilient material and may be adjusted to change the relation of the temples with the sides of the head and will more positively retain said adjustment. The brace 16, in cooperation with the portion 15, is particularly advantageous in preventing the temple from sagging or changing its angular relation relative to the plane of the lenses.

It is to be particularly noted that the bevel 4 of each lens extends from a point adjacent the nasal side of the lens to a point adjacent the temporal side of said lens and that the portion 2 lies behind said bevelled edge 4 with the portion 5 progressing outwardly and downwardly thereof about the peripheral edge of the lens and joined with the lens strap or the lens holding means 6. The portion 5 is shown slightly spaced from the edge of the lens in Fig. I but it is to be understood that this portion may be intimately fitted with the edge if desired. This is also true of the bar-like portions 2.

The arms 2 are triangular in cross section and preferably lie in the plane of the lens. It will also be noted that the bevel 4 of the lens 1 lies in a single plane.

From the foregoing description it will be seen that novel means have been provided for accomplishing all of the objects and advantages of the invention, particularly that of providing a construction whereby the bar-like supports to which the temples are attached will be substantially invisible when the mounting is viewed from the front and will yet possess sufficient body to be durable and effective in their function.

Having described my invention, I claim:

1. In a device of the character described, a pair of lenses, means for holding the lenses in spaced alignment, said lenses having a single, continuous bevel on the upper rear edge portions extending downwardly from adjacent the plane of the front surface of the lenses to the rear surface of said lenses, and lens supporting rim-like members having cooperating inclined portions positioned in the spaces provided by the beveled off portions of the lenses and being so dimensioned as to cross-sectional size as to not project substantially above the front faces of the lenses and so that the major portion of said rim-like members will be substantially invisible when the device is viewed from the front.

2. In a device of the character described, a pair of lenses, means for holding the lenses in spaced alignment, said lenses having a single, continuous bevel on the upper rear edge portions extending downwardly from adjacent the plane of the front surface of the lenses to the rear surface of said lenses, and lens supporting rim-like members triangular in cross section with one face substantially parallel with the beveled portions of the lenses and positioned in the space of said beveled off portions in the plane of the lenses, said members being spaced from the plane of the front faces of the lenses and being so dimensioned as to cross-sectional size as to not project substantially above the front faces of the lenses and so that the major portion of said rim-like members will be substantially invisible when the device is viewed from the front.

3. A device of the character described for use with a pair of lenses having a single, continuous bevel on their upper rear edge portions extending downwardly from adjacent the plane of the front surface of the lenses to the rear surface of said lenses, means for holding the lenses in spaced alignment, and lens supporting rim-like members having a complementary bevel for fitting in the space provided by the beveled off portions of the lenses and being so dimensioned as to cross-sectional size as to not project substantially above the front faces of the lenses and so that the major portion of said rim-like members will be substantially invisible when the device is viewed from the front.

4. In a device of the character described a pair of lenses having a single continuous bevel on their upper rear portions extending downwardly from adjacent the plane of the front surfaces of the lenses to the rear surface of said lenses, means holding the lenses in spaced alignment, and lens supporting rim-like members having a complementary bevel substantially fitting in the space provided by the bevelled off portions of the lenses and being so dimensioned as to cross-sectional size as to not project substantially above the front faces of the lenses and so that the major portion of said rim-like members will be substantially invisible when the device is viewed from the front.

5. In a device of the character described for use with a pair of lenses having a single continuous bevel on their upper rear portions extending downwardly from adjacent the plane of the front surfaces of the lenses to the rear surfaces of said lenses, means for holding the lenses in spaced alignment, and lens supporting rim-like members having a complementary bevel shaped substantially to fit in the space provided by the bevelled off portions of the lenses and being so dimensioned as to cross-sectional size as to not project substantially above the front faces of the lenses and so that the major portion of said rim-like members will be substantially invisible when in assembled relation with the lenses and when viewed from the front.

6. In a device of the character described for use with a pair of lenses having longitudinally recessed upper contour edges with the edge surfaces extending downwardly from adjacent the plane of the front surfaces of the lenses throughout the upper rear portions of the lenses and extending to and intersecting the rear surfaces thereof, means secured to the lenses, temple supporting members secured to said means and bridge means holding said temple supporting members in spaced relation, said temple supporting members each having a portion shaped to lie in the recess along the upper rear portions of the lenses and terminating in a temple connection, the cross-sectional size of said temple supporting members being such as to substantially fill in the recess of said upper longitudinal edge so as to not project substantially above the front faces of the lenses and such that the major portion of said temple supporting members will be substantially invisible when assembled with said lenses and when the device is viewed from the front.

7. In a device of the character described a pair of lenses each having longitudinally recessed upper contour edges with the edge surfaces extending downwardly from adjacent the plane of the front surfaces of the lenses throughout the upper rear portions of the lenses and extending to and intersecting the rear surfaces thereof, means secured to the lenses, temple supporting members secured to said means and bridge means holding said temple supporting members in spaced relation, said temple supporting members each having a portion shaped to lie in the recess along the upper rear portions of the lenses and terminating in a temple connection, the cross-sectional size of said temple supporting members being such as to substantially fill in the recess of said upper longitudinal edge so as to not project substantially above the front faces of the lenses and such that the major portion of said temple supporting members will be substantially invisible when the device is viewed from the front.

EDWARD M. SPLAINE.